Oct. 26, 1926.  
F. W. KLEESE  
LENS  
Filed June 1, 1926   2 Sheets-Sheet 1  
1,604,520
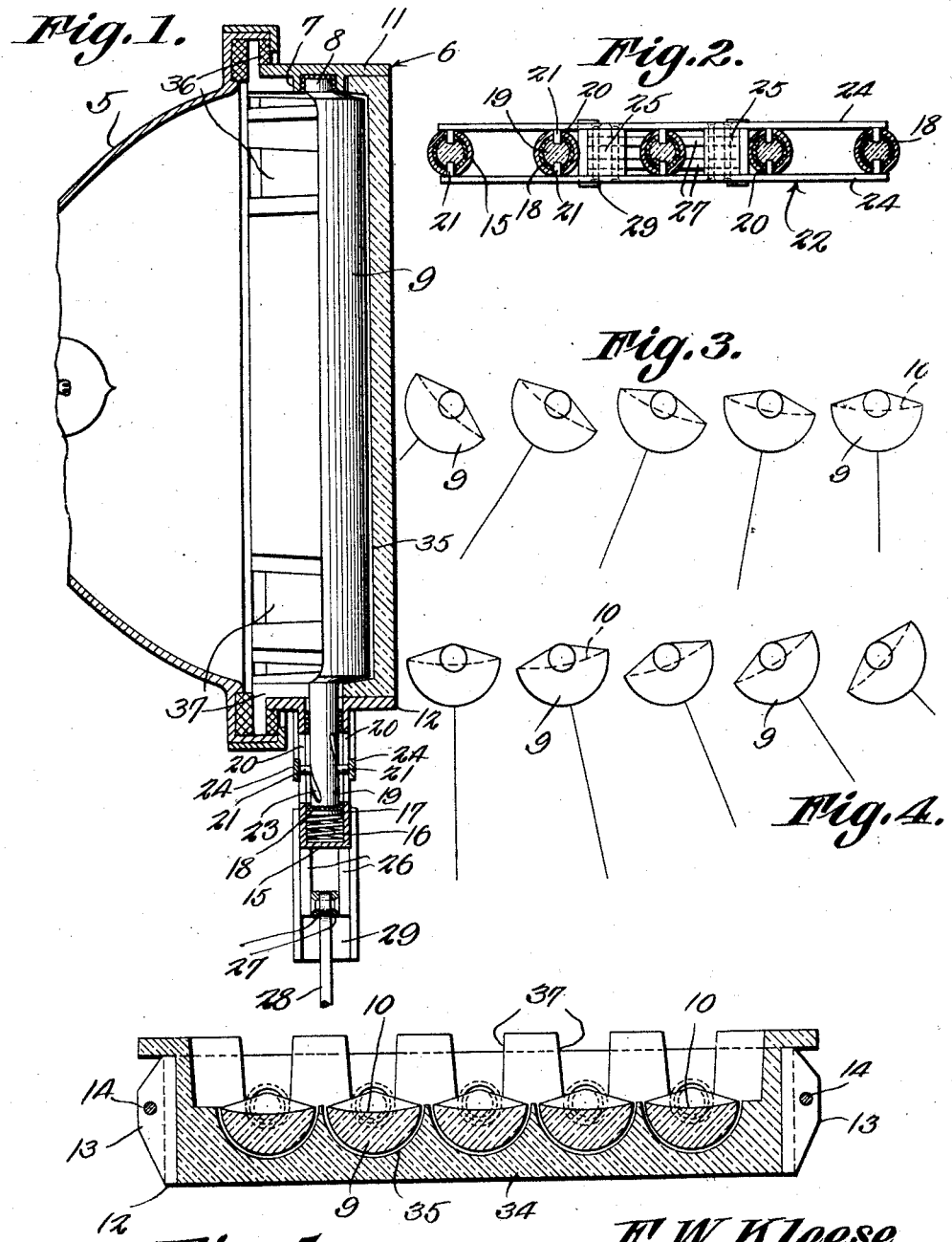
F. W. Kleese  
Inventor,  
By C. A. Snow & Co.  
Attorneys.

Oct. 26, 1926.                                                          1,604,520
                              F. W. KLEESE
                                  LENS
                           Filed June 1, 1926                2 Sheets-Sheet 2
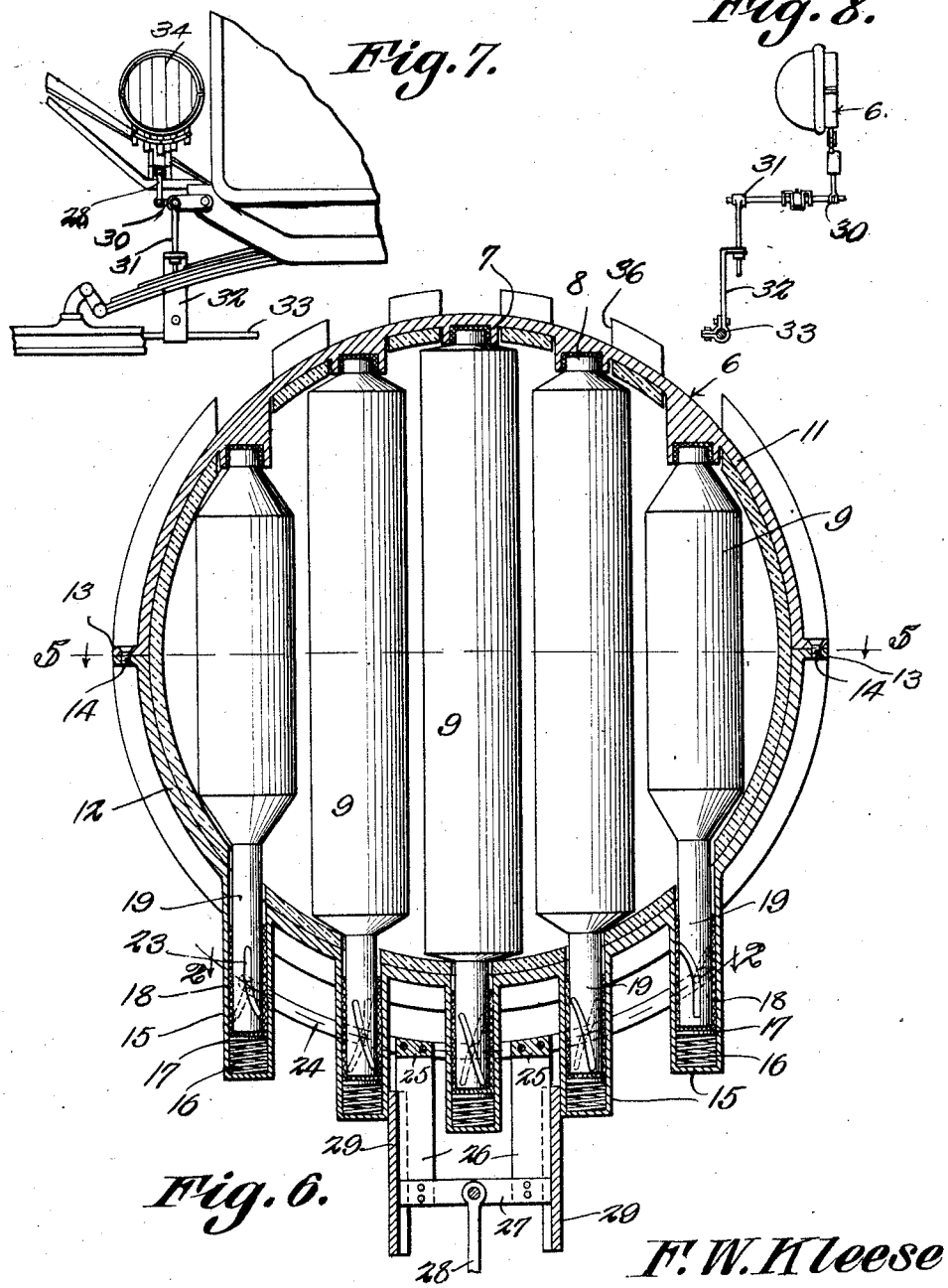
F. W. Kleese
Inventor,
By C. A. Snow & Co.
Attorneys.

Patented Oct. 26, 1926.

1,604,520

UNITED STATES PATENT OFFICE.

FREDERICK W. KLEESE, OF EDMONDS, WASHINGTON.

LENS.

Application filed June 1, 1926. Serial No. 113,051.

The present invention relates to motor vehicle headlights, the primary object of the invention being to provide novel means for automatically projecting light rays from the headlight in such a way that certain portions of the light rays will follow the curve of the road, while other portions of the light rays will be directed forwardly to facilitate night driving.

Another object of the invention is to provide adjustable light projecting lenses adjustable in vertical planes, novel means being provided for automatically moving the adjustable lenses when the wheels of the vehicle have been moved to turn the vehicle as in rounding a curve.

A still further object of the invention is to provide a device of this character which may be readily and easily positioned in the usual headlight construction now in use, thereby eliminating the necessity of replacing the entire headlight construction to install the device constituting the present invention.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a vertical sectional view through a headlight constructed in accordance with the invention.

Figure 2 is a sectional view taken on line 2—2 of Figure 6.

Figure 3 is a diagrammatic view illustrating the lenses moved in one direction.

Figure 4 is a diagrammatic view if the lenses moved in the opposite direction.

Figure 5 is a sectional view taken on line 5—5 of Figure 6.

Figure 6 is a sectional view through the front portion of a headlight equipped with adjustable lenses.

Figure 7 is a fragmental elevational view illustrating the operating means for operating the adjustable lenses.

Figure 8 is a side elevational view thereof.

Referring to the drawings in detail, the reference character 5 indicates the body portion of a headlight which is of the well known construction and to which the device forming the essence of the present invention is secured.

The present invention embodies a supporting band 6 which is formed with circular flanges 7 defining bearings in which the reduced ends 8 of the projecting lenses 9 are mounted for rotation.

These lenses 9 are elongated and have their inner surfaces slightly curved as at 10, and as clearly shown by Figure 5 of the drawings so that the light rays passing through the lenses 9 may be directed straight forward or laterally, according to the position of the lenses 9.

The supporting band 6 includes an upper section 11 and a lower section 12, the sections having right angled end portions 13 that are formed with openings to receive the screws 14 that secure the sections together. As clearly shown by Figure 6, the section 12 is provided with tubular bearings 15 in which the coiled springs 16 are mounted that have their upper ends bearing against the disk 17 which in turn bears against the members 18 that embrace portions of the vertical shafts 19 of the lenses 9 to prevent the shafts 19 from rattling within the tubular members.

The tubular members 15 are formed with slots 20 in opposite sides thereof, which slots accommodate the pins 21 that are carried by the curved actuating member 22, the pins also passing into curved slots 23 formed in the vertical shafts 19. These slots 23 are disposed at various angles with respect to each other so that as the actuating member is moved vertically, the lenses 9 will be moved to various positions with respect to each other as illustrated by Figures 3 and 4 of the drawings.

As illustrated by Figure 2 the actuating member includes a pair of curved bars 24 held in spaced relation by means of the blocks 25 there being provided arms 26 connected with the blocks and bars 24 that are connected with the horizontal bar 27 to which the link 28 is connected. Guides 29 are provided adjacent to the bars 26 and in which the bars 26 move. This link 28 connects with the arm 30 of the bell crank lever 31 which bell crank lever has connection with arm 32 carried by the tie rod 33 of the steering mechanism.

The lens 34 in which the adjustable lenses 9 operate is of a particular construction and is formed with a plurality of cut out portions 35 that are curved to conform to the curvatures of the forward surfaces of the lenses 9 as shown by Figure 5.

A circular flange forms a part of the lens 34 which flange is formed with cut out portions 36 and 37 to permit the lens to be positioned, the cut out portions accommodating the ends 8 and shafts 19, the lens being held within the band 6 as shown by Figure 6.

From the foregoing it will be obvious that when the steering mechanism of a vehicle equipped with light projecting devices constructed in accordance with the invention, is operated to turn the vehicle, to the right, the adjustable lenses at the right side of the headlight on the right side of the car will be turned as shown by Figure 3 of the drawings, and the adjustable headlight lenses of the headlight at the left side of the car will be turned as shown by Figure 4 of the drawing, to the end that the curve around which the vehicle is moving, will be illuminated, while portions of the road surface directly in front of the vehicle will be illuminated.

It will be seen that when the vehicle is moved to the left, the adjustable lenses will take positions in the opposite direction to illuminate the curve at the left of the road.

I claim:

1. A headlight of the class described including a body portion, a supporting band mounted on the body portion and having bearings, elongated vertical lenses having reduced end portions at their upper ends, shafts at the lower ends of the lenses, said shafts and reduced end portions adapted to operate in the bearings, and means for operating the lenses to move them in horizontal planes with respect to each other.

2. A headlight of the class described including a body portion, a main lens having curved cut out portions formed in one surface thereof, vertical lenses operating in the curved cut out portions, and means for automatically adjusting the vertical lenses within the cut out portions of the main lens.

3. A headlight of the class described, including a supporting band having bearing openings, a plurality of lenses operating in horizontal planes, said lenses having their upper ends positioned in bearings of the supporting band, shafts formed on the lower end of the adjustable lenses, said shafts having curved slots formed therein, an actuating bar having pins extending into the slot, and said pins adapted to operate to move the vertical lenses within their bearings.

4. A headlight of the class described, a supporting member, a plurality of vertical lenses mounted on the supporting member, and means for adjusting the lenses various distances with respect to each other.

5. A headlight of the class described, a supporting member, a plurality of vertical lenses mounted on the supporting member, means for simultaneously adjusting the lenses, and means for moving the lenses varying distances with respect to each other.

In testimony that I claim the foregoing as my own, I have hereto affixed my signature.

FREDERICK W. KLEESE.